(12) United States Patent
Zhang (10) Patent No.: US 11,592,693 B2
(45) Date of Patent: Feb. 28, 2023

(54) METHOD FOR FABRICATING TUNABLE OPTICAL PHASED ARRAY, AND TUNABLE OPTICAL PHASED ARRAY

(71) Applicant: SHENZHEN LITRA TECHNOLOGY CO., LTD., Guangdong (CN)

(72) Inventor: Zhongxiang Zhang, Guangdong (CN)

(73) Assignee: SHENZHEN LITRA TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/616,298

(22) PCT Filed: Sep. 29, 2019

(86) PCT No.: PCT/CN2019/109092
§ 371 (c)(1),
(2) Date: Nov. 22, 2019

(87) PCT Pub. No.: WO2021/056545
PCT Pub. Date: Apr. 1, 2021

(65) Prior Publication Data
US 2022/0221746 A1  Jul. 14, 2022

(51) Int. Cl.
*G02F 1/11* (2006.01)
*G02F 1/125* (2006.01)

(52) U.S. Cl.
CPC .............. *G02F 1/116* (2013.01); *G02F 1/125* (2013.01)

(58) Field of Classification Search
CPC ... G02F 1/11; G02F 1/10; G02F 1/116; G02F 1/125; G02F 1/0102; G02F 1/2955; G02F 1/0121; G02F 1/19; G02F 1/33; G02F 1/332; H01S 5/125; H01S 5/124; H01S 5/0607; H01S 3/106; H01S 3/1068; H01S 3/1075
USPC ....... 359/308, 305, 302, 310, 311, 346, 298, 359/247, 285
See application file for complete search history.

(56) References Cited

U.S. PATENT DOCUMENTS

| | | | |
|---|---|---|---|
| 2019/0049562 A1* | 2/2019 | Hirasawa | G01S 17/89 |
| 2019/0094651 A1* | 3/2019 | Timurdogan | G02F 1/335 |
| 2019/0294019 A1* | 9/2019 | Park | G02F 1/19 |

* cited by examiner

*Primary Examiner* — Jie Lei
(74) *Attorney, Agent, or Firm* — Cantor Colburn LLP (57) ABSTRACT

A method for fabricating a tunable optical phased array, and a tunable optical phased array are disclosed by the present application. The tunable optical phased array includes: a substrate layer (10), a distributed Bragg reflector (20), a support layer (30), a piezoelectric layer (40), an antenna array (60), and a transducer module (50) configured to make interconversion between a phase control signal and a surface wave; the antenna array (60) and the distributed Bragg reflector (20) are used to form a Fabry Perot resonant cavity, and the phase control signal output by a signal source is concerted into the surface wave by the transducer module (50), and the surface wave is conducted to the antenna array (60) through the piezoelectric layer (40).

20 Claims, 9 Drawing Sheets

METHOD FOR FABRICATING TUNABLE OPTICAL PHASED ARRAY, AND TUNABLE OPTICAL PHASED ARRAY

CROSS-REFERENCE TO RELATED APPLICATIONS

This application is a national phase application under 35 U.S.C. § 371 of International Patent Application No. PCT/CN2019/109092 filed Sep. 29, 2019, the entire contents of which is incorporated herein by reference thereto for all purposes.

TECHNICAL FIELD

The present application relates to the field of beam steering technologies, and in particularly to a method for fabricating a tunable optical phased array, and a tunable optical phased array.

BACKGROUND

The statements herein merely provide background information related to the present application, and do not necessarily constitute the prior art. Beam steering is a core device in the fields such as laser radar, optical communication, etc. In traditional design schemes, the beam is usually steered by using a mechanical vibration mirror, a micro-mirror in a micro-electromechanical system (MEMS), a bi-prism, photoelectric crystal, liquid crystal and the like. However, the beam steering achieved by a mechanical or micro-mechanical MEMS is provided with disadvantages of relative slow speed, less control flexibility, and poor stability and reliability, and there is a problem that the scanning area is uncontrollable and irregular for the bi-prism when performing the beam steering, and there are problems of a small angle for beam scanning, a large crystal volume, high price and large driving power consumption in the process of beam steering for the photoelectric crystal. Although the liquid crystal based spatial light modulator is relatively mature, but it has problems of slow speed, a complicated driving mode, and weak performance against high and low temperature for a liquid crystal material.

With gradual migration of the laser radar from professional fields such as aerospace, surveying and mapping etc. to fields such as consumption and industry, the traditional beam steering devices and beam scanning methods cannot meet requirements of performance indicators such as volume, power consumption, reliability, stability, and service life in industries such as automobiles, robots, automation and the like. Thus, there is an urgent need for a new type of beam steering device and beam scanning method.

Technical Problem

One of the objectives of the embodiments of the present application is to provide a method for fabricating a tunable optical phased array and a tunable optical phased array, which aims to solve the problems in related art that there are a relatively low beam steering speed, small control flexibility, and poor stability and reliability for beam steering.

SUMMARY

In order to solve the above technical problems, the technical solutions adopted by the present application are that:

a first aspect provides a tunable optical phased array, which includes a substrate layer, a distributed Bragg reflector, a support layer, a piezoelectric layer, an antenna array, and a transducer module configured to make interconversion between a phase control signal and a surface wave;

wherein the distributed Bragg reflector is arranged on a surface of the substrate layer, the support layer is arranged between the piezoelectric layer and the distributed Bragg reflector, the antenna array and the transducer module are arranged on a surface of the piezoelectric layer, and the antenna array and the distributed Bragg reflector form a Fabry Perot resonant cavity.

A second aspect provides a method for fabricating a tunable optical phased array, and the method includes:

forming a distributed Bragg reflector on a surface of a substrate layer;

forming an antenna array and a transducer module on a surface of a piezoelectric layer, wherein the transducer module is configured to make interconversion between a phase control signal and a surface wave;

arranging a support layer between the antenna array and the distributed Bragg reflector, so that the antenna array and the distributed Bragg reflector form a Fabry Perot resonant cavity.

The beneficial effects of the method for fabricating a tunable optical phased array and the tunable optical phased array provided by the embodiments of the present application lie in that: the antenna array and the distributed Bragg reflector are used to form the Fabry Perot resonant cavity, and the phase control signal and the surface wave are mutually converted by the transducer module, and the surface wave is conducted to the antenna array through the piezoelectric layer, such that a corresponding oscillation is generated in the Fabry Perot resonant cavity, thereby adjusting the exit phase of the antenna array to achieve the purpose of beam steering.

DESCRIPTION OF THE DRAWINGS

In order to more clearly illustrate the technical solutions in the embodiments of the present application, the drawings needed to be used in the description of the embodiments or exemplary techniques will be briefly described below. It is obvious that the drawings in the following description only describe some embodiments of the present application, and other drawings may be obtained according to these drawings for those of ordinary skill in the art without paying any inventive work.

EMBODIMENTS OF THE PRESENT APPLICATION

In order to make the objects, technical solutions, and advantages of the present application more comprehensible, the present application will be further described in detail below in combination with the accompanying drawings and embodiments. It should be understood that the specific embodiments described herein are merely to illustrate the present application and are not intended to limit the present application.

It should be noted that, when a component is referred to as being "fixed" or "arranged" to another component, the component may be directly or indirectly on said another component. When a component is referred to as being "connected" to another component, the component may be directly or indirectly connected to said another component. The orientations or position relationships indicated by the terms such as "upper", "lower", "left", "right", etc., are based on the orientations or position relationships as shown in the drawings, which are merely for convenience of description, rather than indicating or implying the indicated device or component must have a specific orientation, be constructed and operated in a specific orientation, and thus are not to be construed as limitation to the present application. For those of ordinary skill in the art, the specific meaning of the above terms may be understood on a case-by-case basis. The terms "first" and "second" are used for convenience of description only, and are not to be understood as indicating or implying a relative importance or implicitly indicating the number of technical features. The meaning of "a plurality of" refers to two or more, unless specifically defined otherwise.

In order to explain the technical solutions described in the present application, the following detailed description will be made in conjunction with the specific drawings and embodiments.

Figure 1:
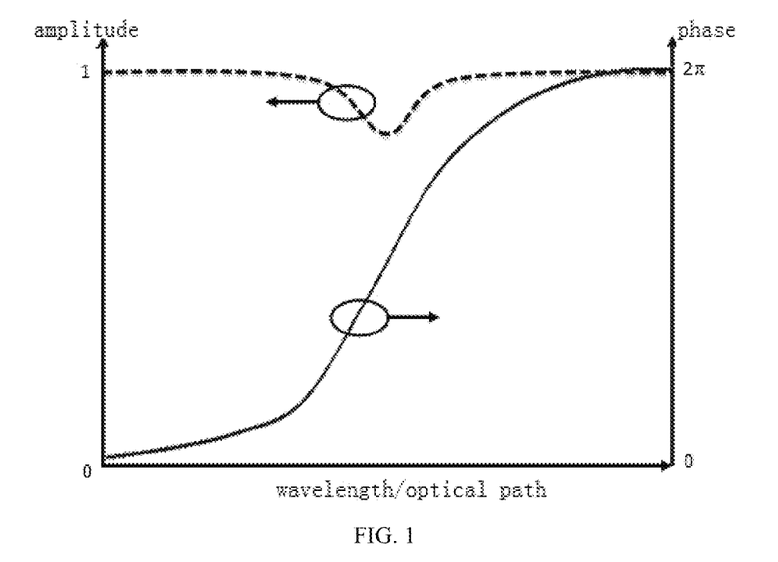
FIG. 1 is a diagram showing relationship among wavelength, optical path, amplitude, and phase according to an embodiment of the present application.

In order to achieve efficient beam deflection and control, an embodiment of the present application uses an optical antenna to provide control of a phase delay from 0 to $2\pi$. Beam steering is achieved by directly projecting light onto the antenna array and then adjusting phase response of each antenna unit. Specifically, an embodiment of the present application uses a surface acoustic wave to control amplitude and phase of the antenna array, specifically an electrical signal is converted into the surface acoustic wave after input to an interdigital transducer. On the other hand, in an embodiment of the present application, a Fabry-Perot (FP) resonant cavity is formed between the antenna array and a distributed Bragg reflector, which can greatly reduce driving power of the surface acoustic wave and enhance the amount of phase delay. The curve indicating change of the amplitude and phase of the asymmetric FP resonant cavity at resonance position as a function of wavelength or optical path in the cavity is shown in FIG. 1, where a slope of the phase change is greater as value Q of the resonant cavity gets higher when considering loss of the cavity material, and vice versa. Therefore, through adjusting the optical path in the cavity, a phase adjustment range from 0 to $2\pi$ may be obtained, and the higher the resonance value Q, the smaller the optical path range that needs to be adjusted.

Figure 2:
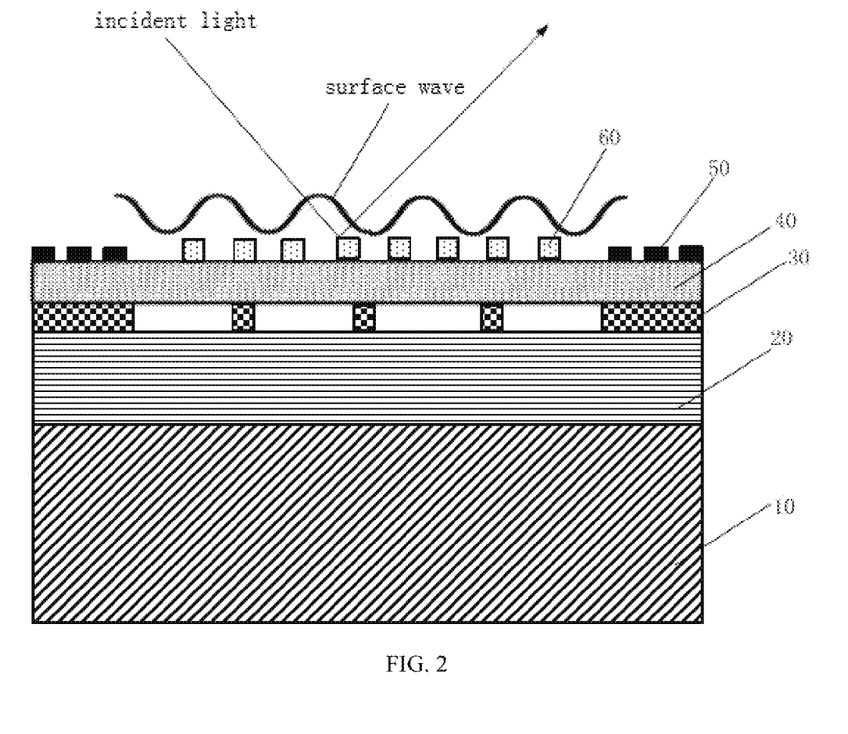
FIG. 2 is a schematic diagram showing a structure of the tunable optical phased array according to an embodiment of the present application.

FIG. 2 is a schematic diagram showing a structure of the tunable optical phased array modulated based on a surface acoustic wave according to an embodiment of the present application. Referring to FIG. 2, the tunable optical phased array in this embodiment includes: a substrate layer 10, a distributed Bragg reflecting mirror 20, a support layer 30, a piezoelectric layer 40, an antenna array 60, and a transducer module 50 configured to implement mutual conversion of a phase control signal and a surface acoustic wave; the distributed Bragg reflecting mirror 20 is arranged on a surface of the substrate layer 10, the support layer 30 is arranged between the piezoelectric layer 40 and the distributed Bragg reflecting mirror 20, the antenna array 60 and the transducer module 50 are arranged on a surface of the piezoelectric layer 40, and a Fabry Perot resonant cavity is formed between the antenna array 60 and the distributed Bragg reflecting mirror 20.

In this embodiment, the transducer module 50 converts the input phase control signal into a surface acoustic wave by using an inverse piezoelectric effect. Since the transducer module 50 is located on the surface of the piezoelectric layer 40, the surface acoustic wave propagates along the surface of the piezoelectric layer 40. In this embodiment, the surface acoustic wave belongs to a mechanical wave. Since the piezoelectric layer 40 is formed of a piezoelectric material that supports excitation and propagation of the surface wave, the surface wave modulates the phase delay of the Fabry Perot resonant cavity formed between the antenna array 60 and the distributed Bragg reflecting mirror 20 when passing through the antenna array 60, so that delay adjustment for an exit phase of the antenna array 60 is performed, at this time the incident beam is directly struck on the antenna array 60. Resultantly, the exit phase of the antenna array 60 is adjusted by the phase control signal provided by a signal source, so as to achieve the purpose of beam steering.

In one embodiment, the transducer module 50 is configured to implement mutual conversion of a phase control signal and a surface wave. For example, the phase control signal may be an electrical signal, and the transducer module 50 converts the electrical signal into a corresponding surface wave, and the corresponding surface wave may be generated through adjusting the size, frequency and fluctuation curve of the electrical signal by a user so as to drive the antenna array 60 to generate a corresponding motion, thereby adjusting the Fabry Perot resonant cavity and achieving the purpose of adjusting the emit phase of the tunable optical phased array.

Further, the phase control signal may also be a laser signal, at this time the transducer module 50 converts the laser signal into a corresponding surface wave to drive the antenna array 60 to generate a corresponding motion, thereby adjusting the Fabry Perot resonant cavity and achieving the purpose of adjusting the emit phase of the tunable optical phased array.

In one embodiment, the surface wave is a mechanical wave propagating along an interface between different media, and the antenna array 60 performs a simple harmonic vibration under the action of the surface wave, so as to adjust the Fabry Perot resonant cavity.

Further, in one embodiment, the surface wave may be a surface acoustic wave.

In one embodiment, the transducer module 50 includes one or more sets of interdigital transducers, each set of the interdigital transducers includes at least one input interdigital transducer configured to convert the electrical signal into the surface acoustic wave.

In one embodiment, each set of the interdigital transducers further includes an output interdigital transducer arranged opposite to the input interdigital transducer and configured to convert the surface acoustic wave into the electrical signal, and the antenna array 60 is arranged between the input interdigital transducer and the output interdigital transducer.

In this embodiment, the input interdigital transducer in the transducer module 50 converts the input electrical signal into a surface acoustic wave by using an inverse piezoelectric effect. Since the input interdigital transducer is located on the surface of the piezoelectric layer 40, the surface acoustic wave propagates along the surface of the piezoelectric layer 40, and finally the surface acoustic wave is converted into an electrical signal output by the other end of the output interdigital transducer. In this embodiment, the surface acoustic wave belongs to an acoustic signal. Since the piezoelectric layer 40 is formed of a piezoelectric material supporting excitation and propagation of the surface acoustic wave, the surface acoustic wave adjusts the phase delay of the Fabry Perot resonant cavity formed between the antenna array 60 and the distributed Bragg reflecting mirrors 20 when passing through the antenna array 60, so that the delay adjustment is performed for the emit phase of the antenna array 60. At this time the incident light is directly irradiated on the antenna array 60, and the exit phase of the antenna array 60 is adjusted through converting the electrical signal provided by the signal source into a surface acoustic wave so as to achieve the purpose of beam steering.

In one embodiment, the transducer module 50 includes two pairs of interdigital transducers, and an angle between the two pairs of the interdigital transducers is 90 degrees.

Figure 3:
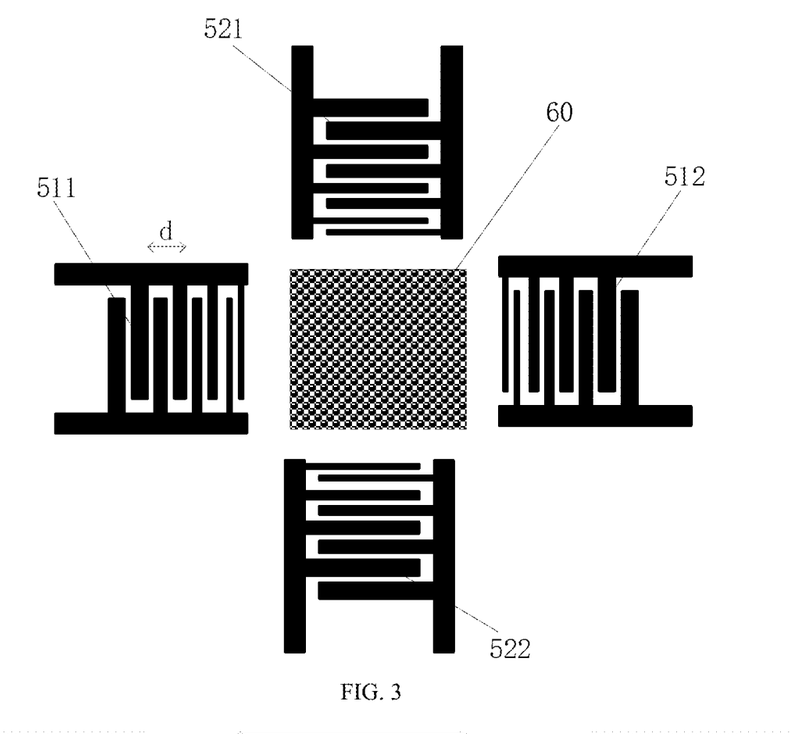
FIG. 3 is a top view of the tunable optical phased array according to an embodiment of the present application.

FIG. 3 is a top view of the tunable optical phased array according to an embodiment of the present application. Referring to FIG. 3, the transducer module 50 includes an input interdigital transducer 511, an input interdigital transducer 521, an output interdigital transducer 512 and the output interdigital transducer 522. The input interdigital transducer 511 and the output interdigital transducer 512 form a set of interdigital transducers, and the input interdigital transducer 521 and the output interdigital transducer 522 form a set of interdigital transducers.

The interdigital transducers in this embodiment are all arranged on the surface of the piezoelectric layer 40, and are shaped like a pattern with fingers of both hands crossed. For example, refer to the input interdigital transducer 511 in FIG. 3, the input interdigital transducer 511 is composed of a plurality of metal electrodes alternately connected to two bus bars. The surface acoustic wave excited is the strongest when the acoustic wavelength ($\lambda$) corresponding to the frequency is equal to the period of the interdigital transducer, and the surface acoustic waves excited by other frequencies are provided with small total amplitude due to phase cancellation. Therefore, the interdigital transducers are frequency selective, and in a specific application, the interdigital transducers with different wavelengths are designed to obtain surface acoustic wave devices with different frequencies.

In one embodiment, the structure of the interdigital transducer may be at least one of a chirped structure, a slanted structure, and an apodized structure.

Figure 4:
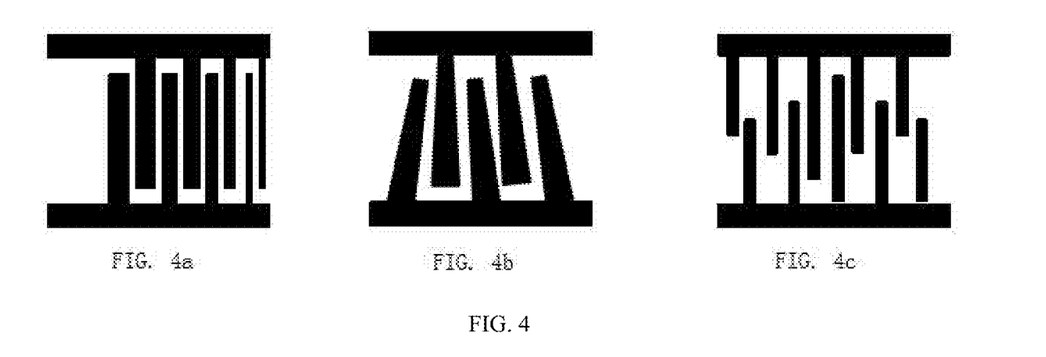
FIGS. 4a, 4b, and 4c are schematic views showing structures of various interdigital transducers according to embodiments of the present application.

In this embodiment, when the interdigital transducer is a chirped structure as shown in FIG. 4c, the signal frequency of the interdigital transducer changes linearly with time, and a frequency change is generated at a front-edge and a trailing-edge of a pulse due to modulation, so that the signal spectrum is broaden and is characterized by a chirp coefficient (also known as a linewidth enhancement factor).

In this embodiment, when the structure of the interdigital transducer is a tilted structure, the interdigital electrodes are changed at a regular interval along an aperture direction of the device, as shown in FIG. 4b. An upper portion of the device excites a signal with high frequencies, and a lower portion of the device excites a signal with low frequencies, so that the drive signal is divided into a plurality of sub-channels with different frequencies, and each channel produces a narrow passband with different frequencies, and finally a wide passband is synthesized, thereby achieving a design for a filter with a wider band.

In this embodiment, when the structure of the interdigital transducer is an apodized structure as shown in FIG. 4a, the interdigital transducer is also called an apodized and chirped interdigital transducer, and the signal frequency of the interdigital transducer varies nonlinearly with time. Specifically, since refractive index of a medium changes dynamically according to influence of modulation of a dynamic electrical signal, the phase of the optical signal propagating in the medium also changes dynamically, and such phase change is directly embodied as dynamic change of the frequency of the optical signal.

In this embodiment, a beam scanning range with a larger field angle may be acquired by arranging the structure of the interdigital transducer as a chirped structure, a tilted structure, or an apodized structure.

Further, through setting an electrode interval of the interdigital transducer, frequency screening for the input signal may be realized, so that the drive frequency is set as at least one of a single frequency, multiple frequencies, and a broadband sweep frequency.

In this embodiment, when a center response frequency of the interdigital transducer is 900 MHz and its bandwidth is greater than 300 MHz, a scanning field angle greater than 10 degrees may be achieved, and a scanning field angle of 60-80 degrees may be realized by using a lens with 5-8 times of the beam expanding.

In one embodiment, the antenna array 60 includes a plurality of nano-antenna elements having a refractive index greater than 1.9, and the plurality of the nano-antenna elements are arranged at a regular interval.

In this embodiment, the plurality of nano-antenna elements are repeatedly arranged, and a spacing distance between adjacent nano-antenna elements is smaller than the wavelength of the incident light. In a particular application, the wavelength range of the incident beam needs to be predetermined, so as to determine that the spacing of the nano-antenna elements in the tunable optical phased array is less than the wavelength of the incident beam.

Further, the size of the nano-antenna element is less than a half of the wavelength of the incident light.

In one embodiment, the antenna array 60 in this embodiment is composed of a high-refractive material, and at this time the antenna array 60 and the distributed Bragg reflecting mirror 20 arranged opposite thereto constitute a unit providing a phase delay of sub-wavelength. Specifically, the phase delay may be adjusted by using an electroelastic effect of the surface acoustic wave generated and propagated on the piezoelectric layer 40 formed by a suspended piezoelectric material and an acousto-optic modulation effect of the surface acoustic wave on the antenna array 60, so as to achieve the purpose of acquiring a large phase delay under low power.

In one embodiment, the material of the nano-antenna element is any one of silicon, gallium arsenide, aluminum gallium arsenide, silicon nitride, and indium phosphide.

In one embodiment, the shape of the nano-antenna element is at least one of a cylinder, a square, a cross, a circular hole, a square hole, a round hole, and a V-shape.

In this embodiment, the nano-antenna elements with different shapes are formed through etching layers of the antenna array by using different masks, and the shape of the nano-antenna element is not limited to a cylinder, a square, a cross, a round hole, a square hole, a cross hole, a V-shaped, which can be set according to user needs.

In one embodiment, as shown in FIG. 3, the structure of the nano-antenna element in the antenna array 60 in this embodiment is cylindrical, and the center wavelength responded in the tunable optical phased array in this embodiment may be 1550 nm in the communication band, wherein a constituent material of the nano-antenna element may be any one of single crystal silicon, polycrystalline silicon or amorphous silicon.

In one embodiment, the material of the piezoelectric layer 40 is the same as the material of the antenna array 60.

Figure 5A:
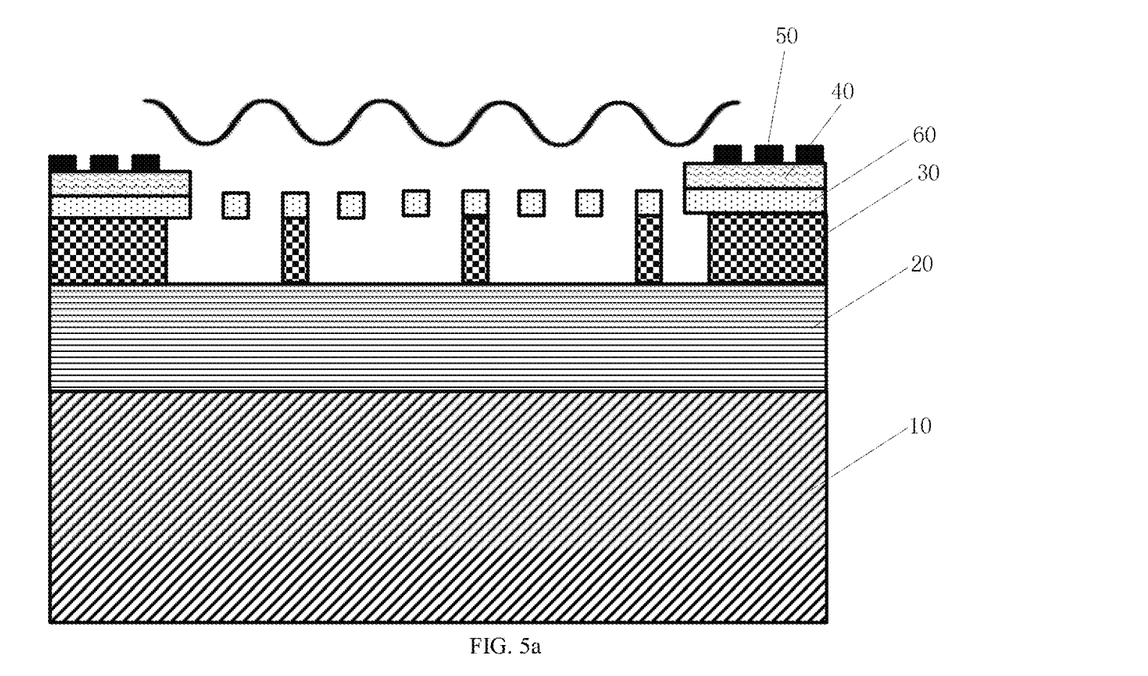
FIGS. 5a and 5b are schematic diagrams respectively showing different structures of a piezoelectric layer and an antenna array using the same material according to an embodiment of the present application.

In this embodiment, the piezoelectric material is used to form the piezoelectric layer 40 and the nano-antenna array, so that the fabrication process of the structure of the tunable optical phased array may be simplified, as shown in FIG. 5*a*. At this time, the nano-antenna element located in the region of the antenna array 60 is supported by the support layer 30, the piezoelectric layer 40 is arranged between the antenna array 60 and the transducer module 50, and the surface wave generated by the transducer module 50 is conducted to the antenna array through the piezoelectric layer 40.

Figure 5B:
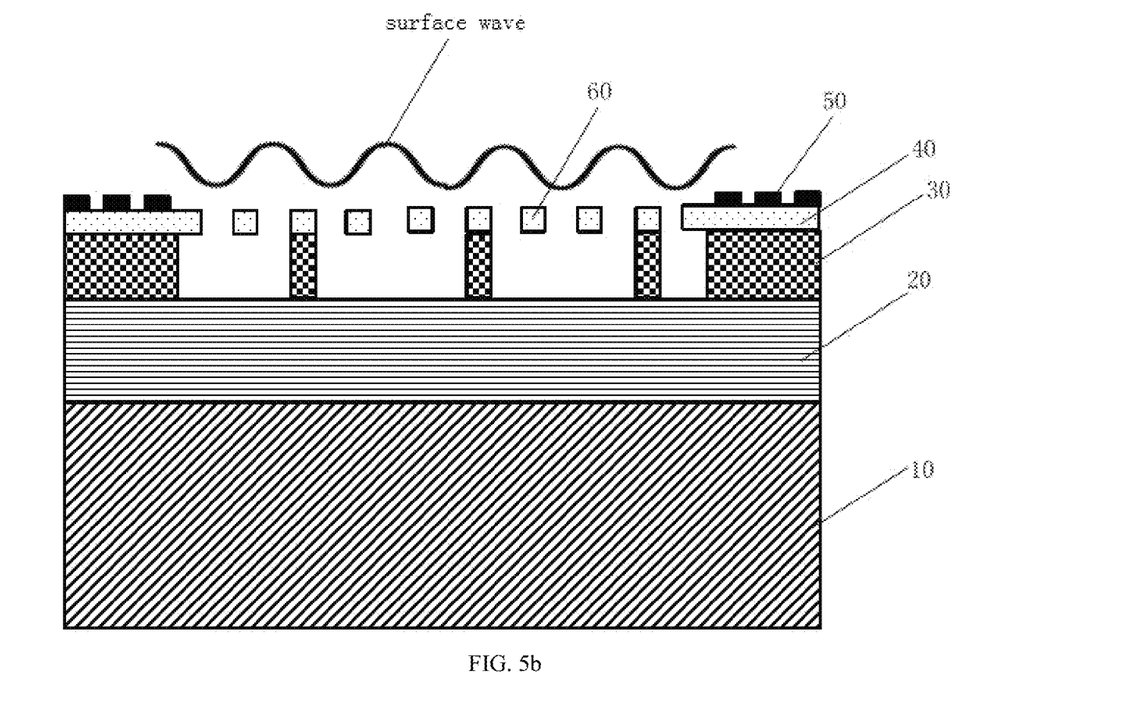
Figure 6:
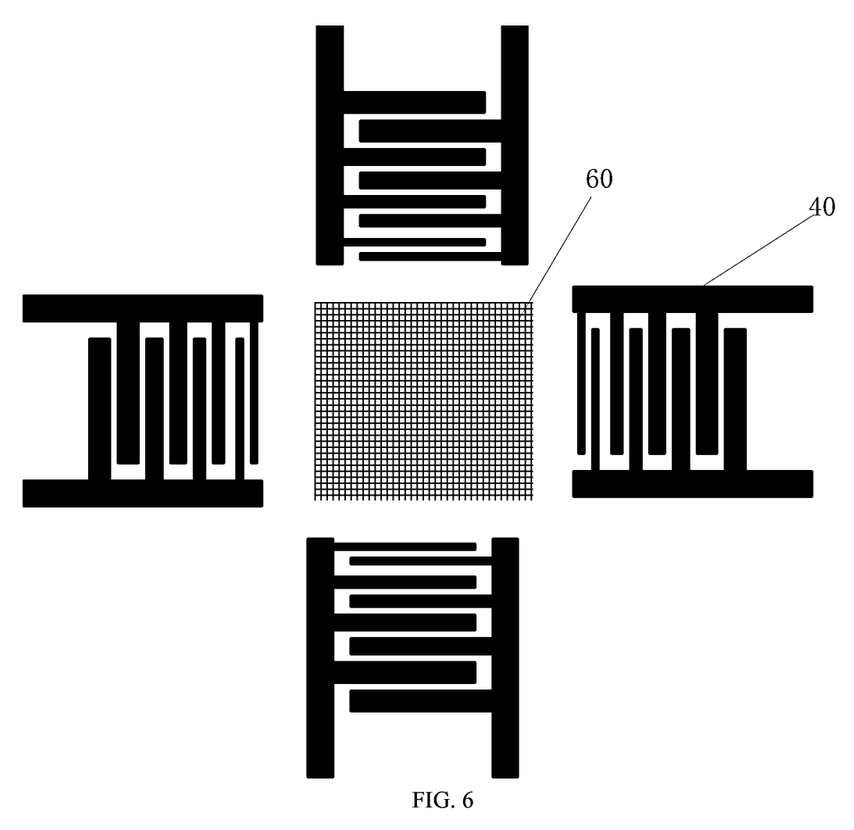
FIG. 6 is a top view of the tunable optical phased array according to another embodiment of the present application.

Further, referring to FIG. 5*b*, the antenna array 60 and the piezoelectric layer 40 in this embodiment are formed of the same piezoelectric material. For example, the antenna array 60 and the piezoelectric layer 40 may both be made of AlGaAs material with a piezoelectric property, as shown in FIG. 6. In this embodiment, the nano-antenna element in the antenna array 60 adopts a cross-shaped structure and is formed by crossed vertical grating structures, at this time the antenna array may be used as a suspended piezoelectric film, which can not only play a role of exciting and propagating the surface acoustic wave but also adjust the phase delay of the antenna array 60 based on the surface acoustic wave so as to achieve the purpose of outputting the exit beam desired by the user through adjusting the phase of the incident beam. In this embodiment, the processing complexity is greatly simplified by integrating the antenna array with the piezoelectric layer.

In one embodiment, the piezoelectric layer 40 is supported by the support layer 30 to form a suspended piezoelectric film, and the suspension height is less than 15 um.

In this embodiment, the support layer 30 is arranged between the piezoelectric layer 40 and the distributed Bragg reflecting mirror 20, and since the antenna array 60 is arranged on the surface of the piezoelectric layer 40, the Fabry Perot resonant cavity (FP cavity) is formed between the antenna array 60 and the distributed Bragg reflecting mirror 20. When the surface acoustic wave is transmitted to the region of the antenna array 60, an oscillation occurs in the Fabry Perot resonant cavity between the antenna array 60 and the distributed Bragg reflecting mirror 20, thereby adjusting the exit phase of the tunable optical array structure.

Further, the piezoelectric layer 40 forms a structure of suspended piezoelectric film by using the support layer 30, which can greatly enhance the electroelastic effect generated by the surface acoustic wave, so that a complete phase delay from 0 to $2\pi$ can be obtained with a relatively small optical path adjustment.

In one embodiment, the support layer includes a plurality of support structures, and a distance between adjacent support structures is greater than the antenna interval. In this embodiment, the antenna interval is the spacing distance between adjacent nano-antenna elements.

In one embodiment, the spacing between adjacent support structures is greater than 10 um.

In one embodiment, the support material used for the support layer 30 may be any one of silicon (Si), gallium arsenide (GaAs), or silicon dioxide ($SiO_2$).

In one embodiment, both the antenna array 60 and the piezoelectric layer 40 may be made of AlGaAs material with a piezoelectric property, and the support material of the support layer 30 is gallium arsenide (GaAs), thereby facilitating selective etch with AlGaAs during the preparation process.

Figure 7:
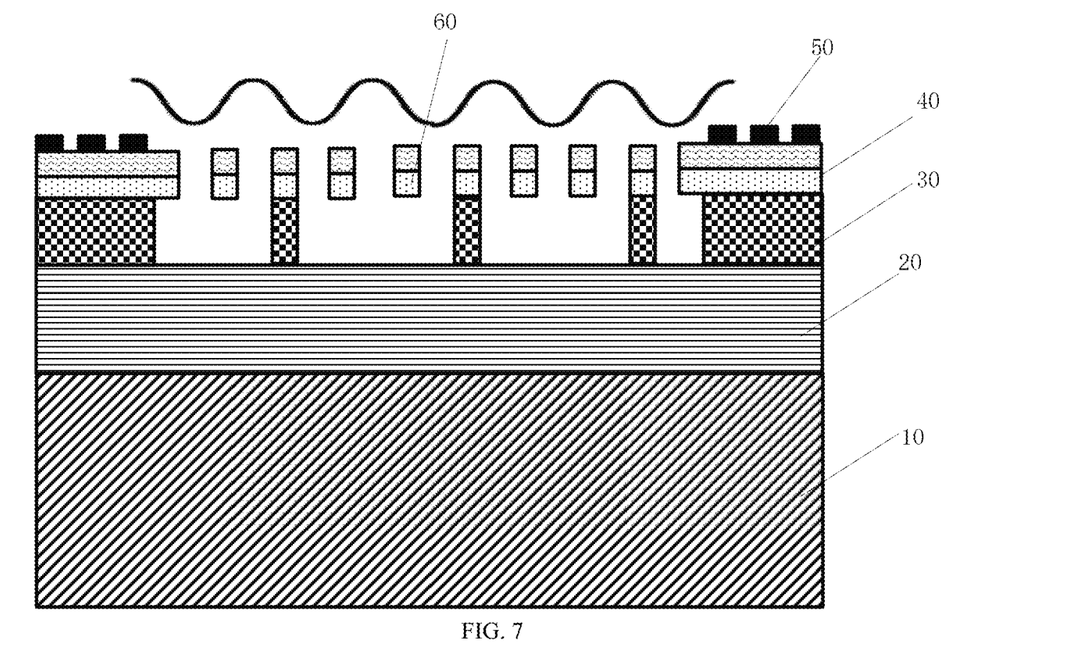
FIG. 7 is a schematic diagram showing a structure of the tunable optical phased array according to another embodiment of the present application.

FIG. 7 is a schematic diagram showing a structure of the tunable optical phased array according to another embodiment of the present application. Referring to FIG. 7, in order to improve electromechanical coupling efficiency of the AlGaAs material, a layer of piezoelectric material having a relatively high electromechanical coupling coefficient is formed on the antenna array 60 prepared by the AlGaAs material to perform energy interconversion, and the piezoelectric material may be lithium niobate, zinc oxide, aluminum nitride or the like.

Further, by using the array structure in this embodiment, the same mask as the AlGaAs layer may be used for etching the region of the antenna array 60, so that higher electromechanical coupling efficiency can be obtained without increasing the complexity of the process.

In one embodiment, the piezoelectric layer 40 has a thickness greater than 200 nm.

In one embodiment, the piezoelectric layer 40 formed by the suspended piezoelectric film has a suspension height less than 15 um, the suspended piezoelectric film has a thickness less than 1 um, and the piezoelectric layer 40 is made of lithium niobate.

In one embodiment, the distributed Bragg reflecting mirror 20 includes a plurality of dielectric layers alternately stacked, and any adjacent two of the dielectric layers have different refractive indices.

In one embodiment, the dielectric layers are made of materials including at least two of titanium oxide (TiOx), silicon dioxide (SiO$_2$), silicon nitride (SiNx), gallium arsenide (GaAs), and aluminum gallium arsenide (AlGaAs). For example, the distributed Bragg reflecting mirror 20 may be formed by stacking dielectric layers such as TiOx/SiO2, SiNx/SiO2, or AlGaAs/GaAs, since titanium oxide (TiOx), silicon dioxide (SiO$_2$), silicon nitride (SiNx), gallium arsenide (GaAs) and aluminum gallium arsenide (AlGaAs) have different refractive indices. When films with different refractive indices are stacked alternately and at a regular interval and the incident light passes through these films with different refractive indices, the reflected lights via the various layers are suggestively interfered due to changes of phase angles, and then are combined with each other to acquire a reflected light with a higher reflectance.

In one embodiment, when the value of the stacking pitch of the dielectric layers with different refractive indices described above is 12, the reflectance of the distributed Bragg reflecting mirror 20 may be up to 99% or more. When the value of the stacking pitch is up to 30, the reflectance of the distributed Bragg reflecting mirror 20 may be up to 99.9%. Herein, the value of the stacking pitch indicates the number of times that the dielectric layers with different refractive indexes are stacked repeatedly. For example, when the distributed Bragg reflecting mirror 20 is stacked by using AlGaAs/GaAs dielectric layers and the value of stacking pitch is 12, it means that the AlGaAs/GaAs is stacked twelve times, that is, twelve layers of AlGaAs and twelve layers of GaAs are stacked alternately.

In one embodiment, the distributed Bragg reflecting mirror 20 is formed by alternately stacking 30 layers of AlGaAs/GaAs, at this time the reflectance of the tunable optical phased array may be up to 99.98%.

In one embodiment, the material of the substrate layer 10 is any one of silicon, gallium arsenide, quartz, sapphire, gallium nitride, and silicon carbide.

Figure 8:
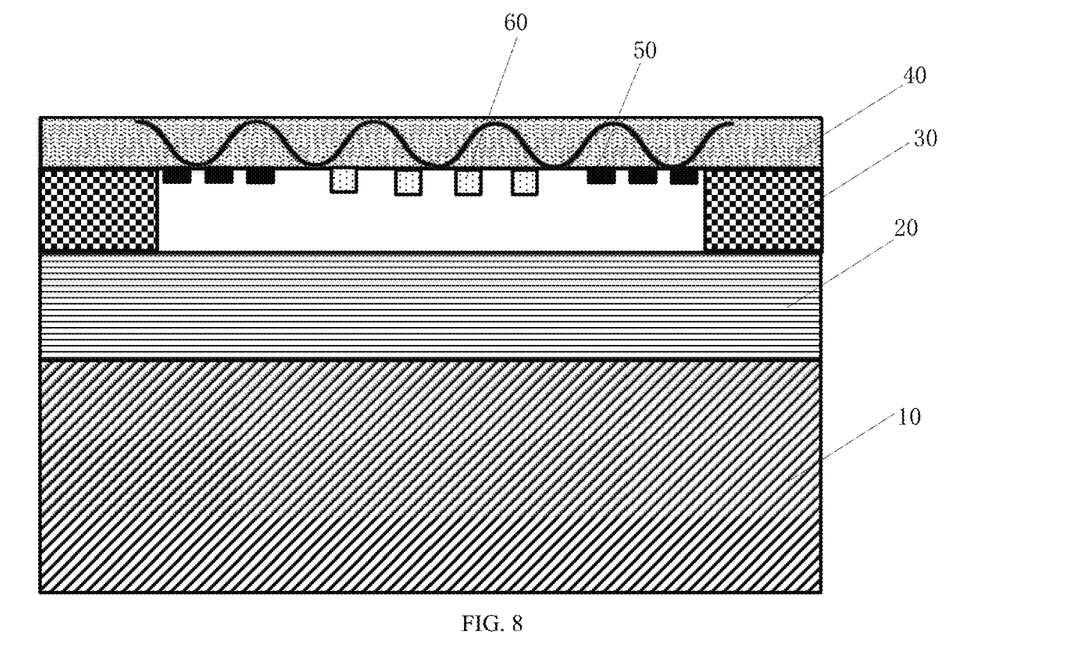
FIG. 8 is a schematic diagram showing a structure of the tunable optical phased array according to yet another embodiment of the present application.
Figure 9:
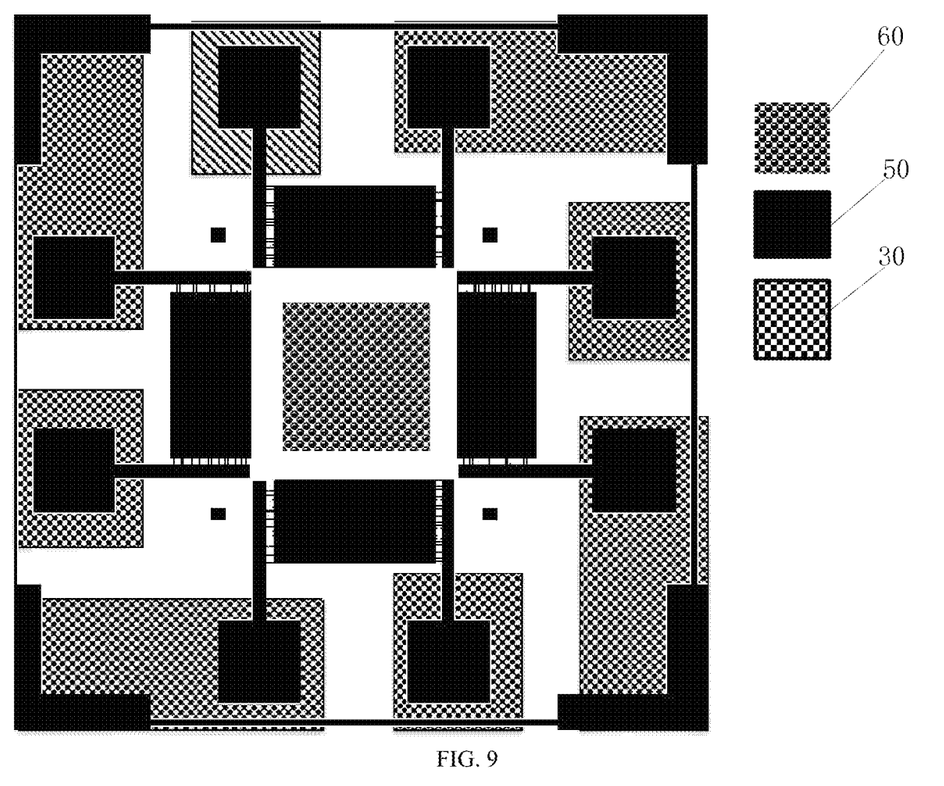
FIG. 9 is a top view showing a structure of the tunable optical phased array according to yet another embodiment of the present application.

FIG. 8 is a schematic diagram showing a structure of the tunable optical phased array according to another embodiment of the present application. Referring to FIG. 8, in order to meet requirements of different technology platforms, in this embodiment, the distributed Bragg reflecting mirror 20 and the piezoelectric layer 40 are prepared separately by a way of wafer bonding. After the two parts are separately fabricated, the two layers are bonded together by a way of wafer bonding. Specifically, in this embodiment, the distributed Bragg reflecting mirror 20 is first formed on the substrate layer 10, then the support layer 30 is formed on the distributed Bragg reflecting mirror 20, and on the other hand, the antenna array 60 and the transducer module 50 are formed on the surface of the piezoelectric layer 40, and finally the two parts are bonded together to form the complete tunable optical phased array, the top view of which is as shown in FIG. 9.

Further, in this embodiment, when the piezoelectric layer 40 is bonded to the support layer 30, the antenna array 60 and the transducer module 50 arranged on the surface of the piezoelectric layer 40 may be located between the piezoelectric layer 40 and the distributed Bragg reflecting mirror 20, and the Fabry Perot resonant cavity is formed between the antenna array 60 and the distributed Bragg reflecting mirror 20.

Figure 10:
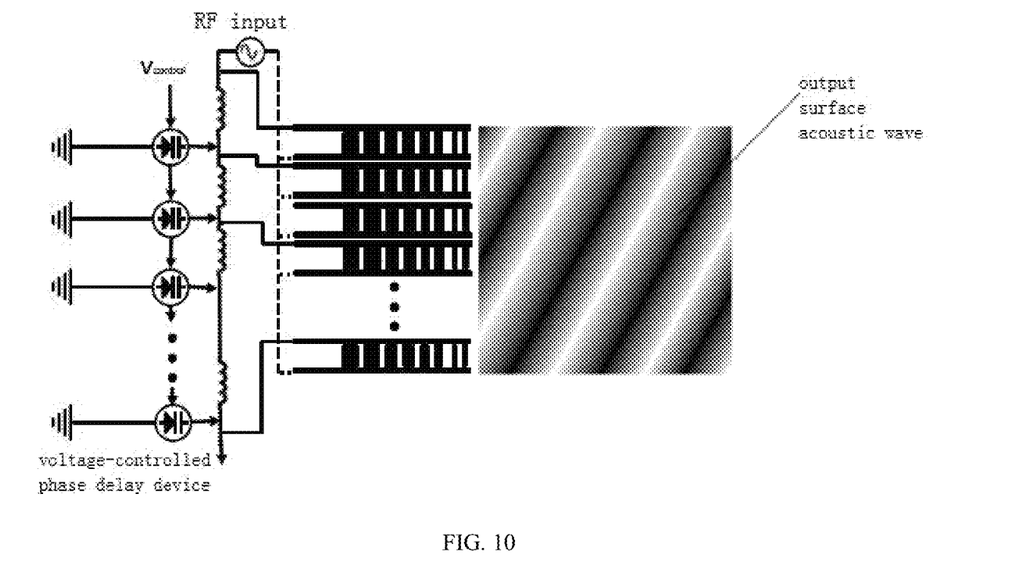
FIG. 10 is a schematic diagram showing layout of an interdigital transducer array according to an embodiment of the present application.

In one embodiment, the arrangement of the bidirectional interdigital transducers (IDT) may generate biaxial spot scanning, but the spots are four spots that are symmetrically distributed over four quadrants. In order to better control a single spot, the design for the interdigital transducers (IDT) may become more flexible, so that biaxial control for a single exit spot may be better achieved. In a specific application, in order to realize that one spot scans planes along two axial directions simultaneously, at this time it is necessary to change the propagation direction of the surface acoustic wave while the frequency of the surface acoustic wave is adjusted. As shown in FIG. 10, through the arrangement of the interdigital transducer array, a phase delay is generated between each two of the interdigital transducers by using a voltage-controlled variable capacitor or an RF vector modulator, thereby realizing phase delay linear transformation between the interdigital transducers and achieving the purpose of adjusting a wavefront of the surface acoustic wave. In this embodiment, the biaxial scanning control of the spot is realized through the design of a single interdigital transducer array, so that the beam control of the surface acoustic wave can be realized based on an electronic circuit.

In one embodiment, this embodiment provides a method for fabricating the tunable optical phased array according to any of the above embodiments, and the method includes: forming a distributed Bragg reflector on a surface of a substrate layer; forming an antenna array and a transducer module on a surface of a piezoelectric layer, here the transducer module is configured to make interconversion between a phase control signal and a surface wave; and arranging a support layer between the antenna array and the distributed Bragg reflector, so that the antenna array and the distributed Bragg reflector form a Fabry Perot resonant cavity.

In this embodiment, the transducer module 50 converts the input phase control signal into a surface wave by using an inverse piezoelectric effect. Since the transducer module 50 is located on the surface of the piezoelectric layer 40, the surface wave propagates along the surface of the piezoelectric layer 40. In this embodiment, the surface wave belongs to a mechanical wave, and since the piezoelectric layer 40 is formed of a piezoelectric material supporting excitation and propagation of the surface wave, and the support layer 30 is provided between the antenna array 60 and the distributed Bragg reflector 20, so that the antenna array 60 and the distributed Bragg reflector 20 form the adjustable Fabry Perot resonant cavity, and the surface wave modulates the phase delay of the Fabry Perot resonant cavity formed between the antenna array 60 and the distributed Bragg reflector 20 when passing through the antenna array 60, thereby the delay of the exit phase of the antenna array 60 is adjusted. At this time, the incident beam is directly struck on the antenna array 60, thus the exit phase of the antenna array 60 is adjusted through the phase control signal provided by the signal source, so as to achieve the purpose of beam steering.

Figure 11:
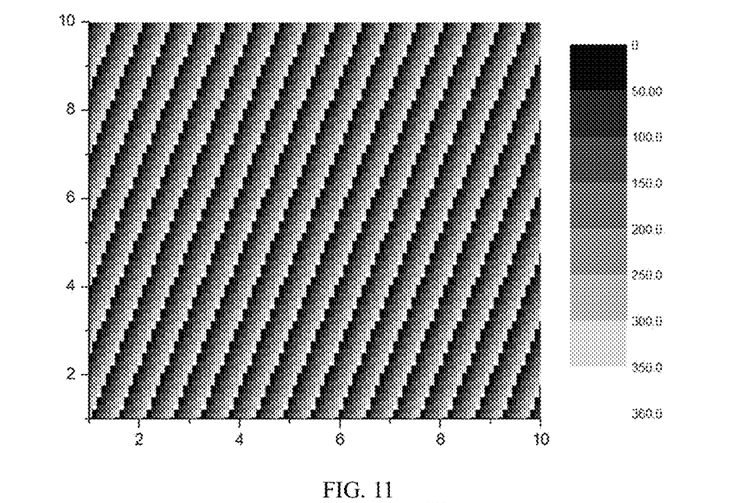
FIG. 11 is a schematic diagram of the phased array with a surface acoustic wave propagating in a direction forming an angle of 20 degrees from a horizontal direction within an antenna array region according to an embodiment of the present application.
Figure 12:
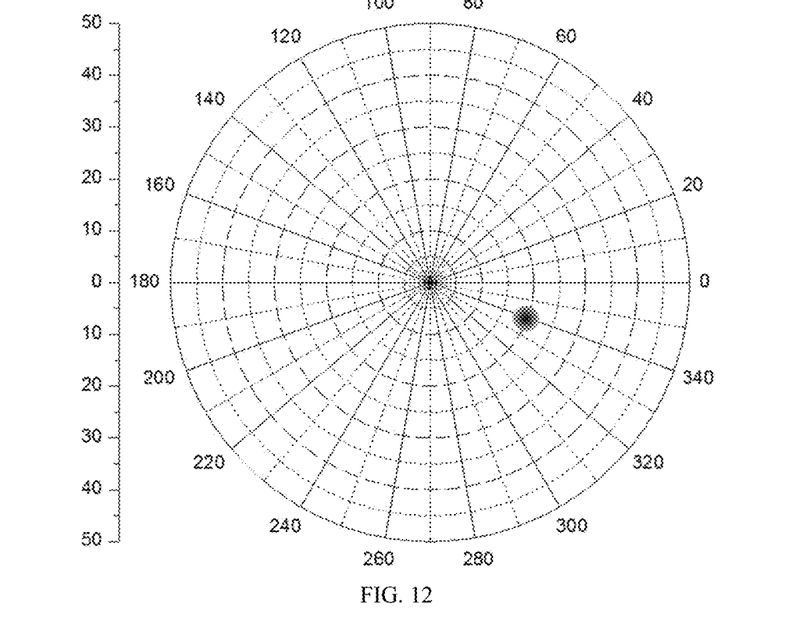
FIG. 12 is a diagram showing spot far-field distribution when a surface acoustic wave propagates in a direction forming an angle of 20 degrees from a horizontal direction within an antenna array region according to an embodiment of the present application.

FIG. 11 is a schematic diagram of the phased array, with a surface acoustic wave having a wave form of a sawtooth wave and propagating in a direction forming an angle of 20 degrees from a horizontal direction within the antenna array region. FIG. 12 is a diagram showing far-field spot distribution when the surface acoustic wave propagates in a direction forming an angle of 20 degrees from the horizontal direction within the antenna array region. In this embodiment, the angle of the incident light after performing phase delay by the antenna array is $\sin\theta = m\lambda/d$ (m is an integer), where $\lambda$ is the wavelength of the surface acoustic wave, and d is the spacing distance between adjacent phased nano-antenna elements in the antenna array. When the surface acoustic wave propagates at an angle of 20 degrees from the horizontal direction within the antenna array region, the far-field spot pattern of the exit light is as shown in FIG. 12, and FIG. 12 is a polar diagram.

Figure 13:
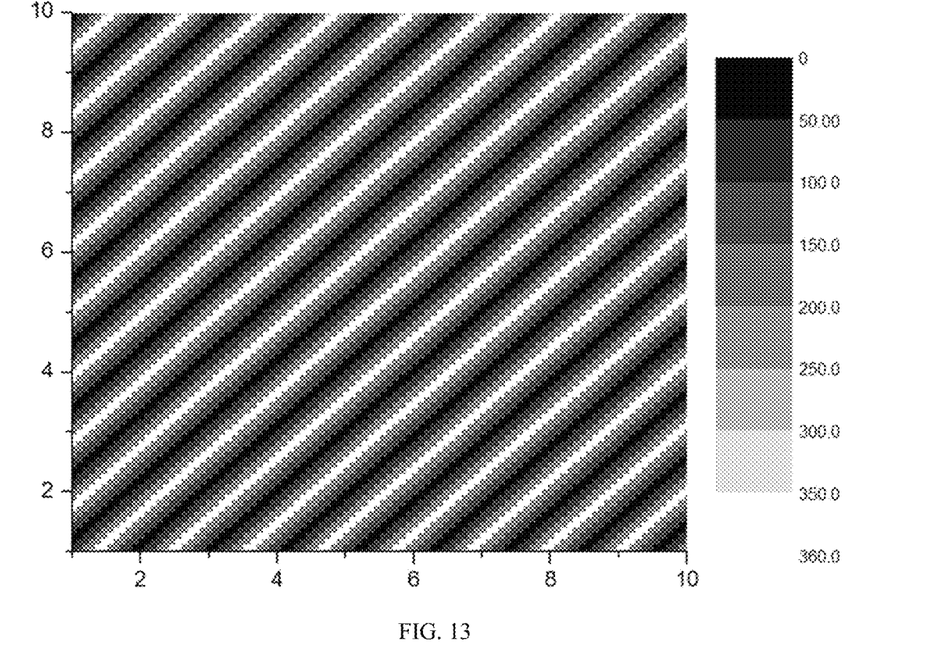
FIG. 13 is a schematic diagram of the phased array with a surface acoustic wave propagating in a direction forming an angle of 45 degrees from a horizontal direction within an antenna array region according to an embodiment of the present application.
Figure 14:
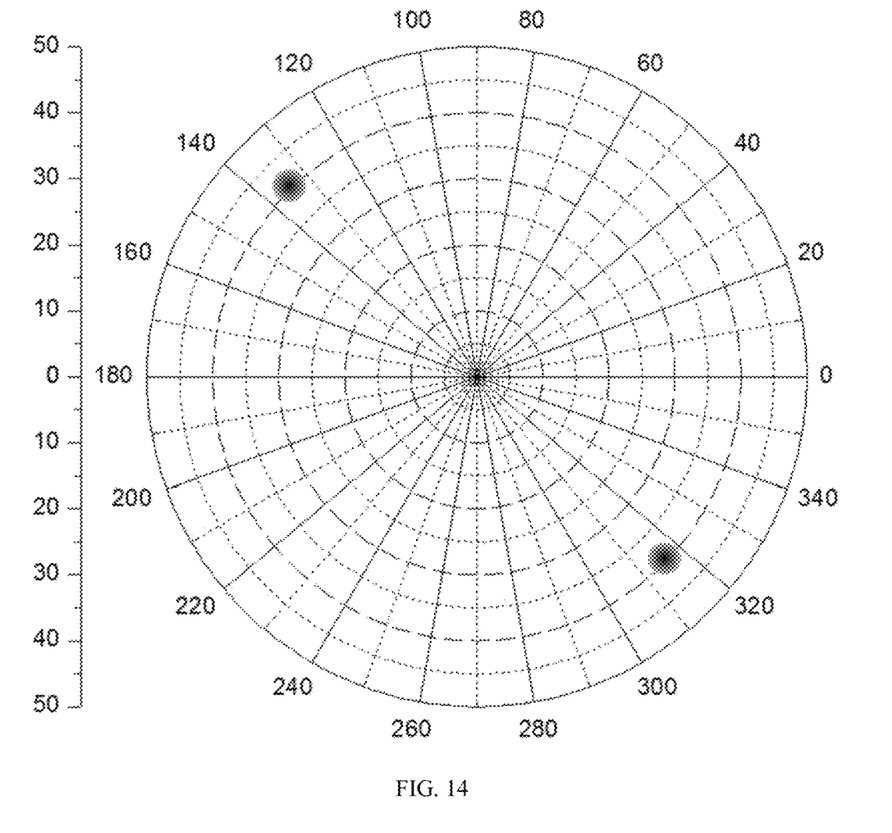
FIG. 14 is a diagram showing spot far-field distribution when a surface acoustic wave is propagated in a direction forming an angle of 45 degrees from a horizontal direction within an antenna array region according to an embodiment of the present application.

FIG. 13 is a schematic diagram of the phased array, with a surface acoustic wave having a wave form of a sine wave and propagating in a direction forming an angle of 45 degrees from the horizontal direction within the antenna array region. Referring to FIG. 13, the surface acoustic wave propagates at an angle of 45 degrees from the horizontal direction within the nano-antenna region, and the generated far-field spot distribution is as shown in FIG. 14. Compared with the sawtooth wave, the sine wave in this embodiment is easier to be generated, but two or more exit optical waves are provided. In a specific application, the utilization and display of the exit optical waves may be performed by constructing a corresponding laser radar optical system.

In one embodiment, the drive frequency of the input interdigital transducer is at least one of a single frequency, multiple frequencies, and a broadband sweep frequency.

In one embodiment, the input interdigital transducer is provided with a drive frequency greater than 300 MHz.

In one embodiment, the bandwidth of the broadband sweep frequency is greater than 100 MHz.

In one embodiment, the arrangement pitch of the nano-antenna elements is smaller than the wavelength of the incident light.

In one embodiment, the size of the antenna element is less than one-half of the wavelength of the incident light. For example, if the wavelength of the incident light may range from 0.1 um to 40 um, and the size of the antenna element is less than one-half of the wavelength of the incident light, then the size of the antenna element may range from 0.001 um to 20 um.

In one embodiment, each set of the interdigital transducers further includes an output interdigital transducer arranged opposite to the input interdigital transducer and configured to convert the surface acoustic wave into an electrical signal, and the antenna array 60 is arranged between the input interdigital transducer and the output interdigital transducer.

In this embodiment, the signal source provides the phase control signal, the output interdigital transducer converts the surface wave into a feedback electrical signal, and the phase control signal, the driving electrical signal and the feedback electrical signal are received by a host, and a working state of the tunable optical phased array is output according to the feedback electrical signal and the phase control signal.

In one embodiment, the transducer module 50 includes a plurality sets of interdigital transducers, here the input interdigital transducer converts the phase control signal into a surface acoustic wave, and the surface acoustic wave is transmitted along the piezoelectric layer to the output interdigital transducer. The output interdigital transducer converts the surface acoustic wave into a feedback electrical signal, compares the phase control signal with the feedback electrical signal, and analyzes the comparison result to determine whether the tunable optical phased array is working normally. For example, if the piezoelectric layer in the tunable optical phased array is damaged or does not conform to a preset technological parameter, the acoustic surface wave will have a large loss or appear abnormality when the acoustic surface wave generated by the interdigital transducer at one end is transmitted to the interdigital transducer at another end. At this time, the feedback electrical signal generated by the output interdigital transducer corresponds to the received surface acoustic wave, therefore, the working state of the tunable optical phased array is determined by comparing the phase control signal with the feedback electrical signal.

In one embodiment, outputting the working state of the tunable optical phased array according to the feedback electrical signal and the phase control signal includes: acquiring a voltage difference value between the feedback electrical signal and the phase control signal; determining whether the voltage difference value is within a preset voltage threshold range, and determining that the working state of the tunable optical phased array is normal if so, otherwise determining that the working state of the tunable optical phased array is abnormal.

In this embodiment, the voltage difference value between the feedback electrical signal and the phase control signal is acquired, and the power loss of the surface acoustic wave during transmission is characterized by the voltage difference value. Then, the greater the loss of the surface acoustic wave during the transmission process, the greater the voltage difference value between the feedback electrical signal and the phase control signal. Further, the user may set a preset voltage threshold range as needed, and determine that the working state of the tunable optical phased array is normal if the voltage difference value is within the preset voltage threshold range, otherwise determine that the working state of the tunable optical phased array is abnormal In the method for fabricating a tunable optical phased array and the tunable optical phased array provided by the present application, the tunable optical phased array includes: a substrate layer, a distributed Bragg reflector, a support layer, a piezoelectric layer, an antenna array, and a transducer module configured to make interconversion between a phase control signal and a surface wave. The distributed Bragg reflector is arranged on a surface of the substrate layer, the support layer is arranged between the piezoelectric layer and the distributed Bragg reflector, the antenna array and the transducer module are arranged on a surface of the piezoelectric layer, and a Fabry Perot resonant cavity is formed between the antenna array and the distributed Bragg reflector. The antenna array and the distributed Bragg reflector are used to form the Fabry Perot resonant cavity, and the phase control signal and the surface wave are mutually converted by the transducer module, and the surface acoustic wave is conducted to the antenna array through the piezoelectric layer, such that a corresponding oscillation is generated in the Fabry Perot resonant cavity, thereby adjusting the exit phase of the antenna array to achieve the purpose of beam steering.

The above description only describes optional embodiments of the present application, and is not intended to limit the present application. Various changes and modifications can be made to the present application by those skilled in the art. Any modification, equivalent substitution, improvement, etc., made within the spirit and principles of the present application are intended to be included within the scope of the appended claims of the present application.

What is claimed is:

1. A tunable optical phased array, comprising a substrate layer, a distributed Bragg reflector, a support layer, a piezoelectric layer, an antenna array, and a transducer module configured to make interconversion between a phase control signal and a surface wave;

wherein the distributed Bragg reflector is arranged on a surface of the substrate layer, the support layer is arranged between the piezoelectric layer and the distributed Bragg reflector, the antenna array and the transducer module are arranged at a surface of the piezoelectric layer, and wherein the antenna array comprises a plurality of nano-antenna elements having a refractive index, and the antenna array and the distributed Bragg reflector form a Fabry Perot resonant cavity.

2. The tunable optical phased array according to claim 1, wherein the transducer module comprises one or more sets of interdigital transducers, and each set of the one or more sets of interdigital transducers comprises at least one input interdigital transducer configured to convert the phase control signal into the surface wave.

3. The tunable optical phased array according to claim 2, wherein each set of the one or more sets of interdigital transducers comprises an output interdigital transducer arranged opposite to the input interdigital transducer and configured to convert the surface wave into a feedback signal, and the antenna array is arranged between the input interdigital transducer and the output interdigital transducer.

4. The tunable optical phased array according to claim 2, wherein a structure of each set of the one or more sets of interdigital transducers is at least one of a chirped structure, a slanted structure, and an apodized structure.

5. The tunable optical phased array according to claim 1, wherein the and refractive index of the plurality of nano-antenna elements is greater than 1.9.

6. The tunable optical phased array according to claim 5, wherein a shape of each of the plurality of nano-antenna elements is at least one of a cylinder, a square, a cross, a round hole, a square hole, and a V-shape.

7. The tunable optical phased array according to claim 5, wherein a material of each of the plurality of nano-antenna elements is any one of silicon, gallium arsenide, aluminum gallium arsenide, silicon nitride and indium phosphide.

8. The tunable optical phased array according to claim 1, wherein a material of the antenna array is the same with a material of the piezoelectric layer.

9. The tunable optical phased array according to claim 1, wherein the piezoelectric layer is supported by the support layer to form a suspended piezoelectric film, wherein a suspension height of the piezoelectric layer is less than 15 um.

10. The tunable optical phased array according to claim 1, wherein the support layer comprises a plurality of support structures, and a distance between adjacent two of the support structures is greater than an antenna pitch.

11. The tunable optical phased array according to claim 1, wherein the piezoelectric layer has a thickness greater than 200 nm.

12. The tunable optical phased array according to claim 1, wherein the distributed Bragg reflector comprises a plurality of dielectric layers alternately stacked, and any adjacent two of the dielectric layers have different refractive indices.

13. A method for fabricating a tunable optical phased array that comprises a substrate layer, a distributed Bragg reflector, a support layer, a piezoelectric layer, an antenna array, and a transducer module configured to make interconversion between a phase control signal and a surface wave, wherein the method comprises:
  forming the distributed Bragg reflector on a surface of the substrate layer;
  forming the antenna array and the transducer module on a surface of the piezoelectric layer, wherein the antenna array comprises a plurality of nano-antenna elements having a refractive index, and wherein the transducer module is configured to make interconversion between a phase control signal and a surface wave;
  arranging the support layer between the antenna array and the distributed Bragg reflector, so that the antenna array and the distributed Bragg reflector form a Fabry Perot resonant cavity.

14. The method according to claim 13, wherein a distance between adjacent two of the plurality of nano-antenna elements in the antenna array is less than a wavelength of incident light.

15. The method according to claim 14, wherein each of the plurality of nano-antenna elements has a size less than one-half of the wavelength of the incident light.

16. The method according to claim 13, wherein the transducer module comprises one or more sets of interdigital transducers, and each set of the one or more sets of interdigital transducers comprises at least one input interdigital transducer configured to convert the phase control signal into the surface wave.

17. The method according to claim 16, wherein each set of the one or more sets of interdigital transducers comprises an output interdigital transducer arranged opposite to the input interdigital transducer and configured to convert the surface wave into a feedback signal, and the antenna array is arranged between the input interdigital transducer and the output interdigital transducer.

18. The method according to claim 16, wherein a drive frequency of the input interdigital transducer is at least one of a single frequency, multiple frequencies, and a broadband sweep frequency.

19. The method according to claim 18, wherein the drive frequency of the input interdigital transducer is greater than 100 MHz.

20. The method according to claim 18, wherein the broadband sweep frequency has a bandwidth greater than 100 MHz.

* * * * *